Sept. 20, 1932.        G. E. WARD ET AL        1,878,352
DOUGH ROLLING MACHINE
Filed July 25, 1930        2 Sheets-Sheet 1
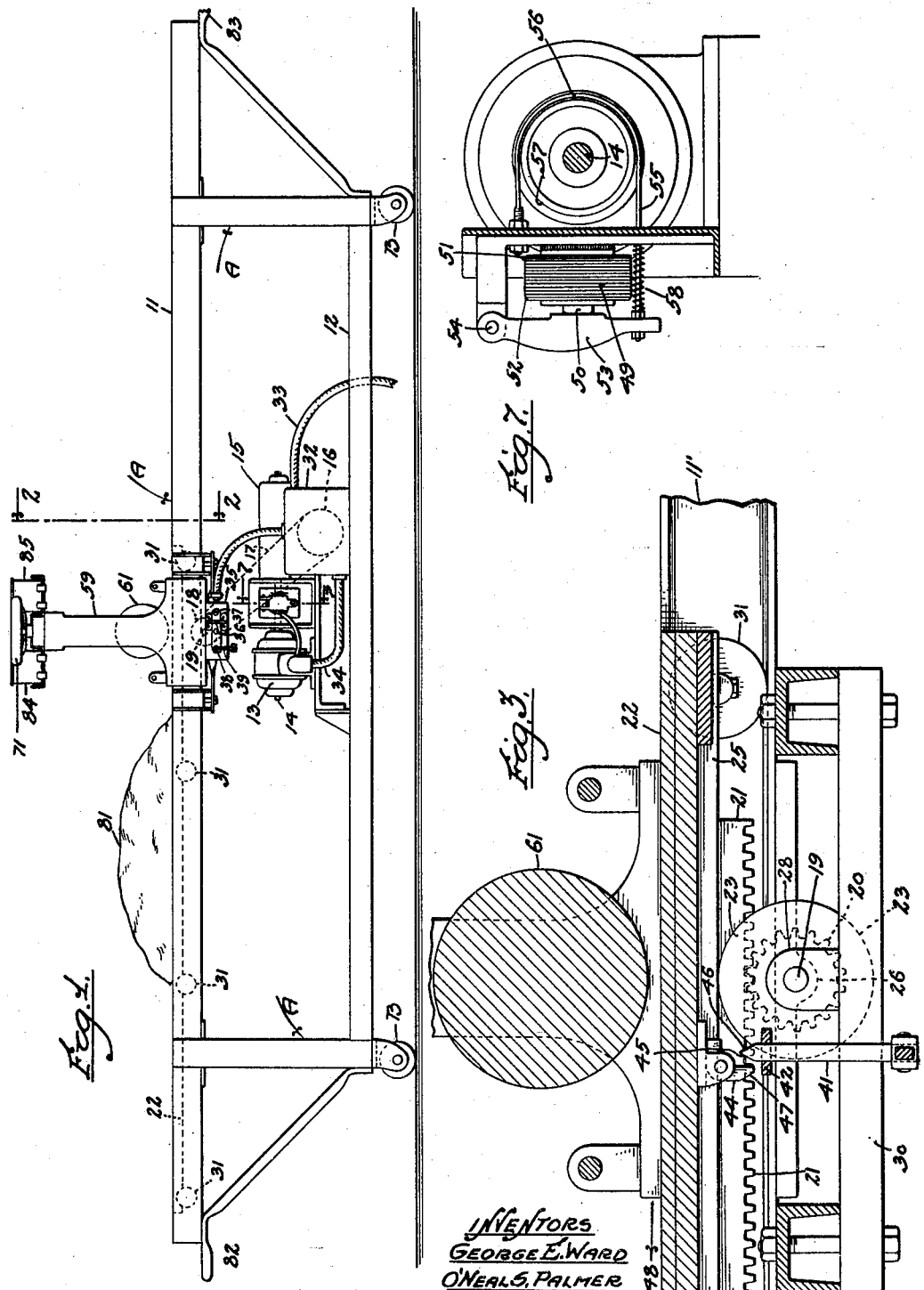
INVENTORS
GEORGE E. WARD
O'NEAL S. PALMER
By ATTORNEY Sept. 20, 1932.   G. E. WARD ET AL   1,878,352
DOUGH ROLLING MACHINE
Filed July 25, 1930   2 Sheets-Sheet 2
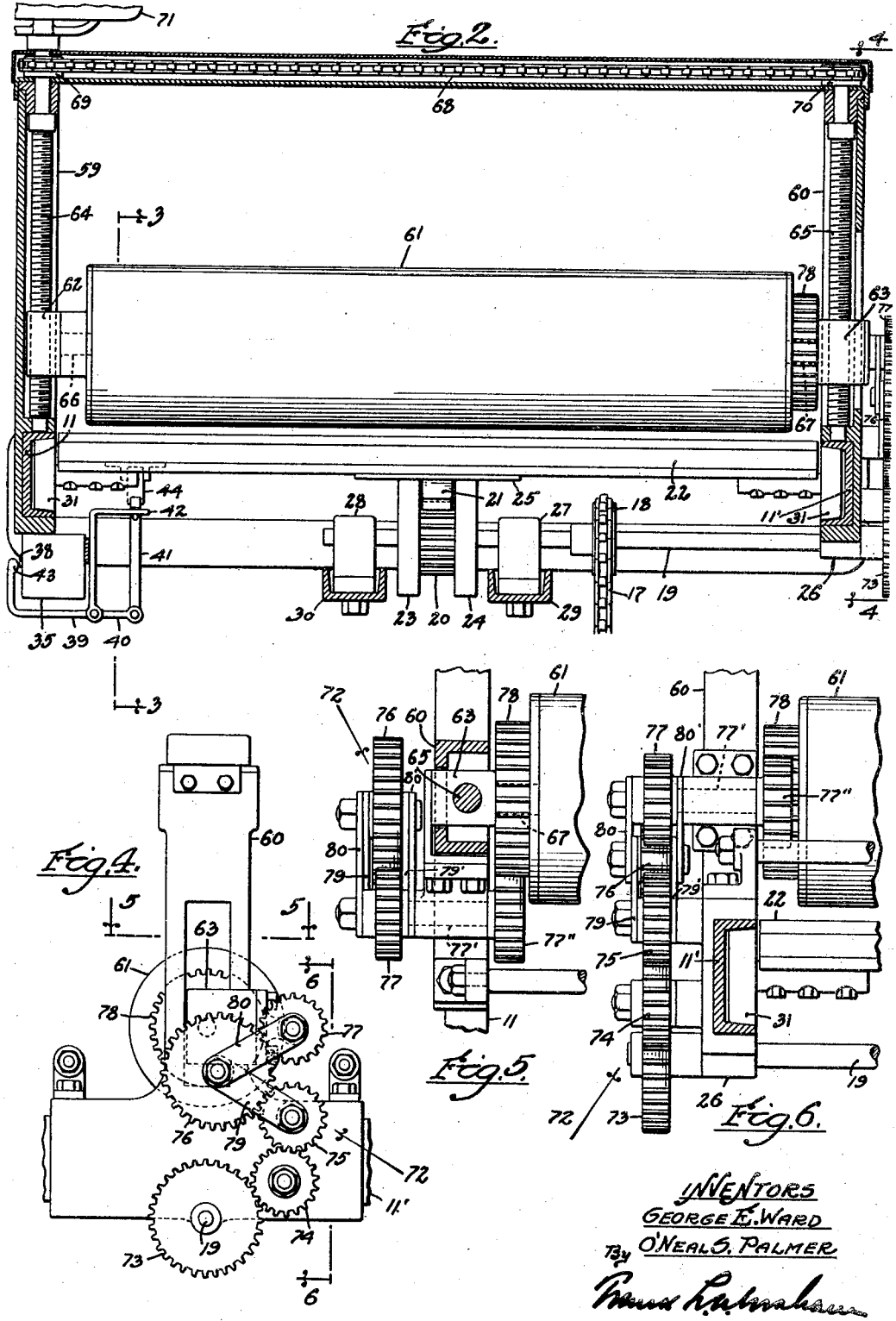

Patented Sept. 20, 1932

1,878,352

UNITED STATES PATENT OFFICE

GEORGE E. WARD, OF LOS ANGELES, AND O'NEAL S. PALMER, OF GLENDALE, CALIFORNIA, ASSIGNORS TO DAVIS STANDARD BREAD COMPANY, A CORPORATION OF CALIFORNIA

DOUGH ROLLING MACHINE

Application filed July 25, 1930. Serial No. 470,615.

This invention relates to machinery used in preparing mixtures for baking, and deals particularly with a dough rolling machine.

To those familiar with the art of baking, it is common knowledge that dough is prepared in a variety of forms for various purposes. For instance, various kinds of doughs are prepared, such as bread dough, coffee cake dough, Danish dough, and puff paste dough. Each of these doughs requires a certain thickness for the purpose intended. To obtain various thicknesses in sheets of dough, we are aware that machines having spaced rollers have been used to a certain extent, such machines being more specifically identified as brake machines. However, the brake machine has been found in practice to be adaptable to roll small pieces of dough only, and when employed to roll large masses of dough has been found highly objectionable, in that the dough is torn and otherwise produced in a lumpy sheet of uneven thickness and texture.

Perceiving that there was need for a machine to roll dough in a sheet having uniform density, thickness, and texture, we conceived the idea of rolling dough out upon a movable table by means of an adjustable roller. This type of machine is distinct from the double roll type, and is capable of producing thin sheets of dough of a uniform thickness, such sheets being necessary for pie shells, pie crusts, pastry, and the like.

Briefly stated: The machine embodied in this invention comprises a movable table and a fixed roll which operates in conjunction with the table to roll sheets of dough of various thicknesses, together with attending mechanism for operating the table with the utmost efficiency.

It accordingly becomes a prime object of this invention to provide a dough rolling machine having a movable table with a stationary roll adapted to roll dough upon the table as the table passes beneath the roll, the travel of said table being reversible to provide a succession of rolling operations on the same mass of dough.

Another object is to equip a dough rolling machine of the character described with automatic means for stopping the table after each dough rolling operation.

A further object is to provide a table braking means automatically operated to stop the table after each dough rolling operation.

A still further object is to provide an adjustable roll in a table of this type, and to drive said roll synchronously with respect to the travel of the table by means of an extensible train of gears.

Other objects and advantages will appear as the description proceeds in conjunction with the drawings, in which—

Fig. 1 is a side elevational view showing our entire machine;

Fig. 2 is a view taken substantially on line 2—2 of Fig. 1;

Fig. 3 is a view taken substantially on line 3—3 of Fig. 2;

Fig. 4 is a view taken on line 4—4 of Fig. 2;

Fig. 5 is a view taken on line 5—5 of Fig. 4;

Fig. 6 is a view taken on line 6—6 of Fig. 4; and

Fig. 7 is a view taken on line 7—7 of Fig. 1.

In the drawings illustrating our invention, we have shown a frame, generally designated A, mounted upon casters shown at B. The frame A is provided with upper spaced parallel channel members 11, and 11', which are turned inwardly, as shown in Fig. 2, to provide a track for wheels carrying a movable table. Mounted upon a lower platform 12 carried by the frame A, is a motor 13 driving a shaft 14, which, in turn, operates through a gear reduction box, generally designated 15, to drive a sprocket, as shown at 16. The sprocket 16, in turn, drives a sprocket chain 17, which drives a sprocket 18, mounted upon a shaft 19. The shaft 19 may be journaled in the frame in any suitable manner, and for this purpose we have shown a bearing 26 upon one of the channel members 11, and bearings 27 and 28 mounted upon channels 29 and 30, respectively, which channels are, in turn, supported in any suitable manner upon the frame A. Mounted upon the shaft 19 is a pinion gear 20, which meshes with a rack 21 secured to the bottom of a movable table 22. On opposite sides of the gear 20 we have provided circular flanges 23 and 24, which are adapted to span the rack 21 and ride upon a plate 25, upon the bottom of the table 22, thus affording a non-frictional bearing surface for the central portion of the table.

The arrangement just described is operable to move the table 22 between the channel members 11 and 11', and in order to provide a smooth traveling table, we have equipped the table with rollers 31, suitably mounted thereon, which rollers ride in the inner face of the channels 11 and 11', and produce a traveling table characterized by precision and smoothness of operation. It is a part of this invention to alternately operate the table in reverse direction. For this purpose, we have provided a conventional reversing switch which is enclosed in a switch box designated 32. The source of power is brought into the switch box through the conduit 34. In conjunction with the reversing switch 32 we employ a switch block 35 suitably mounted upon the frame A, having push buttons 36 and 37 for reversing the motor 13. It is to be understood that the button 36 serves to operate the motor in one direction while the button 37 will reverse the motor and cause the table to travel in the opposite direction. These buttons are manually operated. In conjunction with the buttons 36 and 37 there is a third button 38 which serves to stop the table when traveling in either direction. This button is automatically operated by the travel of the table, and is actuated at a predetermined point by automatic means comprising a lever arm 39 fulcrumed as shown at 40. Pivotally connected to one end of the lever arm 39 is a link 41, which is guided through a slotted member 42. The opposite end of the lever arm 39 is bent upwardly around the switch block 35 and is provided with an inturned portion 43 adapted to engage the button 38 when the link 41 is depressed. The means for depressing the link 41 comprises a pawl 44 pivotally mounted on the under side of the table 22. The link 41 is provided at the upper end with sloping faces 45 and 46, and the pawl 44 is provided with a sloping face 47.

It is clear that as the pawl 44 engages the link 41 when the table is traveling in the direction of the arrow 48 that the link 41 will be depressed and the switch will be operated to stop the travel of the table.

It is also clear that as the table travels in the reverse direction the pawl will ride over the link without depressing the same. It is to be understood that two pawls are required in order to stop the table at the end of the travel in each direction, and that a similar pawl is mounted at the opposite end of the table, the only difference being that the slope on the pawl and the pivotal arrangement of the pawl are reversed.

In conjunction with the automatic means for stopping the travel of the table in either direction, we have provided an electrically actuated brake, said brake comprising a coil 49 having a core 50. The coil 49 is energized through leads 51 and 52, which are connected directly to the conductors which conduct electricity to the motor 13. The coil 49 being energized will pull the arm 53 which is pivotally connected, as shown at 54, and will release the tension on the rod 55 that controls a brake band 56, which rides on a brake drum 57 mounted upon the shaft 14. It is thus clear that during the time current is supplied to the motor 13, the arm 53 will be down and the brake band will be released from the drum, thus permitting the shaft to rotate freely. However, as soon as the current is cut off from the motor, the arm 53 is released from the core 50, and under the urge of a spring 58 the brake band 56 is forced into contact with the drum 57, and automatically supplies a braking action to the shaft 14, which is the prime mover of the table 22. This arrangement will be appreciated as providing a quick-stopping action to the table, and is pointed out as being particularly adaptable to an arrangement of this sort wherein the table must necessarily be of a heavy construction and unless some braking means were employed, the time required for the stopping of the table would introduce an objectionable feature.

As before stated, this invention embodies a roll in conjunction with the traveling table, said roll being designated 61 and being adapted to perform a rolling action with the traveling table hereinbefore described. The means of mounting and coordinating said roll consists of a pair of upstanding frame members designated 59 and 60, suitably mounted upon the channel members 11 and 11' respectively.

Means is provided for raising and lowering the roll relative to the surface of the table 22, and, as shown, consists of blocks 62 and 63 slidably mounted in the members 59 and 60, respectively. The blocks 62 and 63 are in turn supported upon screw-threaded shafts 64 and 65, and provide a support for the roll 61, by means of a shaft 66 which is journaled in the block 62, and a shaft 67 which is journaled in the block 63. This arrangement will be recognized as providing a roll that is vertically movable relative to the table 22. The means for simultaneously rotating the shafts 64 and 65 comprise any suitable mechanism which will rotate the shafts in unison, such as miter gears or sprocket chains. In this instance, we have optionally shown a sprocket chain 68 driven by a sprocket gear 69 on the shaft 64, and driving a sprocket gear 70 on the shaft 65. A handwheel 71 is provided on the shaft 64 for manually rotating the shafts 64 and 65 to raise or lower the roll 61 as desired.

A feature of this invention resides in the fact that the roll is driven at a speed to correspond with the speed of the table. As a means of accomplishing this purpose, and at the same time permitting the adjustable feature of the roll, we have provided an extensible system of gears, generally designated 72. More specifically describing this system of gears, it is shown as comprising a spur gear 73 mounted on the shaft 19. The shaft 19 will be recognized as the same shaft that drives the table 22. The gear 73, in turn, meshes with a gear 74 rotatably mounted upon the channel 11'. The gear 74, in turn, meshes with the gear 75, also rotatably mounted upon the channel 11'. The gear 75 drives a floating gear 76, which, in turn, drives a gear 77 that is rotatably mounted upon the sliding block 63. The gear 77 is mounted upon a shaft 77' which is journaled on the sliding block 63 and drives a similar gear 77''. The gear 77'' drives the gear 78, which is mounted upon the roll 61 and serves to rotate the roll. The floating gear 76 is held in constant mesh with the gears 75 and 77 by means of radial arms 79, 79', 80 and 80'. It is clear with this arrangement that no matter what position the gear 77 takes with respect to the gear 75, the gear 76 will always be in mesh with both gears. It is also clear that, in an arrangement of this character, if the proper ratio is maintained throughout the train of gears comparable to the rack and pinion arrangement 20 and 21, the foot speed of the table may be regulated in conformity with the foot speed of the roll 61.

In operation, a mass of dough, such as shown at 81, is placed upon the table, and the operator presses the button 36, which causes the table to move forwardly and carry the dough under the roll 61. The dough is rolled into a sheet of uniform thickness corresponding to the position in which the roll 61 has been set. The table having passed through a predetermined travel, is automatically brought to a stop and the dough may then be folded for a return, or removed if the rolling is finished. If the dough is to be returned for a further rolling, it is properly prepared and the operator pushes the button 37, thus setting the table in motion in the opposite direction.

After each rolling operation the roller may be adjusted either upwardly or downwardly, according to the requirements. The process of rolling may be continued until a sheet of dough the thickness of paper will be produced. The value of thus being able to roll a mass of dough into a sheet of such thinness is of prime consideration to a concern manufacturing large quantities and lies in the fact that dough may be precisely rolled to produce a sheet of dough having uniform thickness, uniform density, uniform texture, uniform mixture, and consequently uniform production with a uniform cost of production.

When the sheet of dough has been brought to the proper thickness, it is either cut into required sizes or may be removed intact and used for any suitable purpose.

Another operation to which this invention is particularly applicable is in rolling puff paste doughs. By using a table of the character described, in conjunction with an adjustable roll, the puff paste may be placed upon a sheet of dough, and the edges folded over whereupon the entire mass is sent under the roller. This operation will thoroughly mix the puff paste into the dough and will yield a uniform mixture having extreme uniformity of thickness and density.

Since the machine is provided with casters, it becomes a portable machine and may be moved from place to place, thereby making it available for rolling doughs of various ingredients, such as bread dough, coffee cake dough, Danish pastry, pie shells and crust, cinnamon rolls, and, in fact, dough of all descriptions.

For the purpose of moving the table about, we have provided handles 82 and 83 at opposite ends of the machine. As a means toward the end of providing the utmost efficiency, flour pans 84 and 85 may be mounted upon the standards 59 and 60, and these pans will form a handy means of dusting the table with flour before each rolling operation.

A table of the character described will be appreciated as providing a means of rolling masses of dough into sheets of any required thickness for any purpose.

Although we have shown our invention in a single embodiment, nevertheless we are aware that under the doctrine of equivalents, certain parts may be modified and refined. Accordingly, we reserve the right to all such modifications and alterations that may occur in the nature of refinements in the manufacture of such a device that fall within the scope of the specification and the essence of the invention as expressed in the appended claims.

We claim as our invention:

1. A dough rolling machine embodying: A frame; a table adapted to travel in said frame; a roll mounted in said frame and spaced above said table; power means for driving said table and said roll; means for causing said table to travel in said frame; means for simultaneously rotating said roll to perform a rolling action in conjunction with said table; and means mounted on said table and arranged to engage a member on said frame for stopping said power means to stop the travel of the table and the rotation of the roll at a predetermined point.

2. A dough rolling machine embodying: A frame; a table adapted to travel in said frame; a roll mounted in said frame and spaced above said table; power means for driving said table and said roll; means for causing said table to travel in said frame; means for simultaneously rotating said roll to perform a rolling action in conjunction with said table; means mounted on said table and arranged to engage a member on said frame for stopping said power means to stop the travel of the table and the rotation of the roll at a predetermined point; and means for reversing said power means to drive said table and said roll to perform a rolling action in the opposite direction.

3. A dough rolling machine embodying: A frame; a table adapted to travel in said frame; a roll mounted in said frame and adjustably spaced above said table; an electrical motor for driving said table and said roll to perform a rolling action; means mounted on said table and arranged to operate a switch on said frame for shutting off the current to said motor at a predetermined point in the travel of said table; and an electrically actuated brake operable to stop the travel of said table when the current to the motor is shut off.

In testimony whereof, we have hereunto set our hands at Los Angeles, California, this 14th day of July, 1930.

GEORGE E. WARD.
O'NEAL S. PALMER.